United States Patent Office.

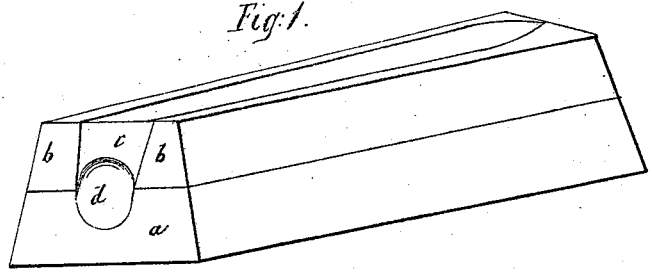
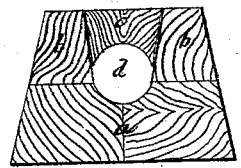
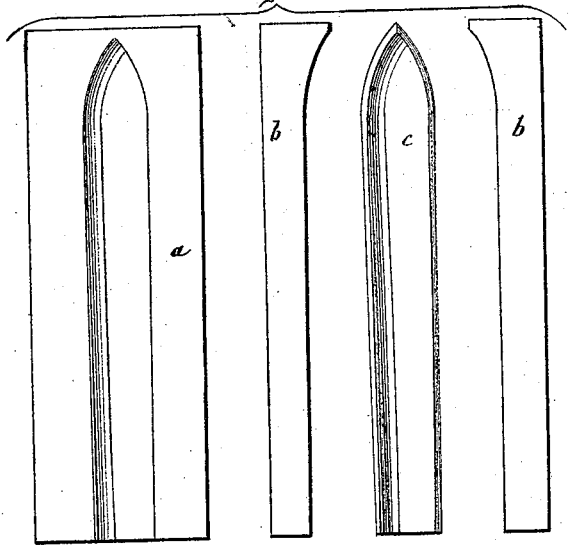

NICHOLAS H. BORGFELDT, OF NEW YORK, N. Y.

Letters Patent No. 110,732, dated January 3, 1871.

IMPROVEMENT IN CIGAR-MOLDS.

The Schedule referred to in these Letters Patent and making part of the same.

*To all whom it may concern:*

Be it known that I, NICHOLAS H. BORGFELDT, of the city, county, and State of New York, have invented a new and useful Improvement in Cigar-Molds; and I do hereby declare that the following is a clear and exact description thereof, which will enable those skilled in the art to make and use the same, reference being had to the accompanying drawing forming part of this specification, in which drawing—

Figure 1 represents a perspective view of this invention.

Figure 2 is a transverse section of the same.

Figure 3 is a plan showing the various parts composing my mold.

Similar letters indicate corresponding parts.

This invention relates to an improvement in the construction of that class of cigar-molds for which Letters Patent have been granted to me November 22, 1870. Such molds are used in each cigar-manufactory by the hundreds or thousands, and it becomes of great importance to construct them in the cheapest and most expeditious manner. This purpose I have endeavored to accomplish by constructing the mold of four parts, viz., the base, two side pieces, and the follower, in the following manner:

I take a piece of wood about equal in thickness to the whole thickness of the mold, (or, if desired, two pieces of wood may be taken, the combined thickness of which is equal to that of the mold to be produced,) drill a hole, $d$, into the same equal in diameter to the butt or outer end of the cigar to be produced, and then I cut the piece of wood lengthwise in two parts through the middle of the hole, one part to form the base, $a$, and the other part to form the side pieces $b\ b$ and the follower $c$.

The depth of the hole $d$ depends upon the shape of the cigars to be produced.

I then take the two pieces of wood and force them up from opposite sides against a revolving cutter or milling-tool having the exact shape of the cigars to be produced. By the action of the milling-tool the hole in the two pieces of wood is brought in the shape of a cigar. After this has been accomplished I put the base $a$ on one side, and take the other piece of wood, put in it a guide turned in the shape of a cigar, of steel or other hard material, and then I cut along the sides of this guide with a thin scroll-saw, so as to separate the side pieces $b$ from the follower $c$. The side pieces are finally secured to the base by brads and glue, or in any desirable manner, and the mold is ready for use. By these means a cigar-mold is obtained which is composed of four pieces, $a\ b\ b\ c$, and which is so constructed that it can be produced very cheap and without much loss of time.

It must be remarked that single molds only can be produced according to my invention, since the side pieces $b$, after having been separated from the follower $c$, have to be moved in for the thickness of the kerf or cut produced by the saw, so that, after said side pieces have been secured to the base in the proper position the follower will fit closely between them, and the outer surfaces of the mold have to be smoothed off after the side pieces have been secured in position on the base.

If desired, I am enabled to produce a cigar-mold which is entirely closed at the tip end, since the milling-tool used to give to the cavity in the mold the final shape can be so made that it does not cut through the wood at the tip end of the mold.

What I claim as new, and desire to secure by Letters Patent, is—

A cigar-mold constructed of four pieces, viz., the base $a$, the side pieces $b\ b$, and the follower $c$, substantially in the manner herein shown and described.

N. H. BORGFELDT.

Witnesses:
  W. HAUFF,
  E. F. KASTENHUBER.